United States Patent
Scott

(10) Patent No.: US 10,469,927 B1
(45) Date of Patent: Nov. 5, 2019

(54) BEVERAGE COOLER ASSEMBLY

(71) Applicant: Kevin Scott, Knightdale, NC (US)

(72) Inventor: Kevin Scott, Knightdale, NC (US)

( * ) Notice: Subject to any disclaimer, the term of this patent is extended or adjusted under 35 U.S.C. 154(b) by 0 days.

(21) Appl. No.: 16/009,322

(22) Filed: Jun. 15, 2018

(51) Int. Cl.
  *H04R 1/02* (2006.01)
  *H04R 9/06* (2006.01)
  *H04N 5/225* (2006.01)
  *F25D 31/00* (2006.01)

(52) U.S. Cl.
  CPC ........... *H04R 1/028* (2013.01); *F25D 31/002* (2013.01); *H04N 5/2252* (2013.01)

(58) Field of Classification Search
  CPC ...... H04R 1/028; F25D 31/002; H04N 5/2252
  See application file for complete search history.

(56) References Cited

U.S. PATENT DOCUMENTS

| | | | |
|---|---|---|---|
| 4,886,183 A | 12/1989 | Fleming | |
| D354,202 S | 1/1995 | Smith | |
| 5,969,592 A | 10/1999 | Reed | |
| 5,990,790 A * | 11/1999 | Lusareta | A47G 23/0306 206/459.1 |
| 8,752,726 B2 | 6/2014 | Molz | |
| 9,560,431 B1 * | 1/2017 | Lilly | H04R 1/028 |
| 2002/0160345 A1 | 10/2002 | Hempton | |
| 2002/0180601 A1 | 12/2002 | Street | |
| 2003/0210141 A1 * | 11/2003 | Iacovino | B65D 81/3879 340/539.1 |
| 2006/0219858 A1 * | 10/2006 | Iacovino | A47G 23/02 248/311.2 |
| 2008/0083767 A1 | 4/2008 | O'Neal | |
| 2009/0038317 A1 * | 2/2009 | Otey | F25B 21/04 62/3.2 |
| 2015/0122688 A1 * | 5/2015 | Dias | A47G 19/025 206/459.1 |
| 2015/0245723 A1 * | 9/2015 | Alexander | A47G 19/027 99/483 |
| 2015/0335184 A1 * | 11/2015 | Balachandran | A47G 19/2288 219/438 |
| 2015/0341302 A1 * | 11/2015 | Balachandran | H04L 51/24 340/815.4 |
| 2016/0360917 A1 * | 12/2016 | Richardson | A47J 31/0576 |
| 2017/0042373 A1 * | 2/2017 | Alexander | A47J 36/2472 |
| 2017/0263102 A1 * | 9/2017 | Tshilombo | G08B 21/182 |
| 2018/0051918 A1 * | 2/2018 | VanTubergen, Jr. | F25B 21/04 |

* cited by examiner

*Primary Examiner* — Simon King

(57) ABSTRACT

A beverage cooler assembly for PURPOSE includes a cylinder and an insulator that is positioned within the cylinder. The insulator insertably receives a beverage container. Moreover, the insulator is comprised of a thermally insulating material to inhibit thermal communication between the beverage container and ambient air. An audio unit is coupled to the cylinder to emit audible sounds outwardly therefrom. The audio unit is selectively placed in wireless electrical communication with an electronic device thereby facilitating the audio unit to receive and play an audio signal from the electronic device.

1 Claim, 6 Drawing Sheets

BEVERAGE COOLER ASSEMBLY

STATEMENT REGARDING FEDERALLY SPONSORED RESEARCH OR DEVELOPMENT

Not Applicable

THE NAMES OF THE PARTIES TO A JOINT RESEARCH AGREEMENT

Not Applicable

INCORPORATION-BY-REFERENCE OF MATERIAL SUBMITTED ON A COMPACT DISC OR AS A TEXT FILE VIA THE OFFICE ELECTRONIC FILING SYSTEM

Not Applicable

STATEMENT REGARDING PRIOR DISCLOSURES BY THE INVENTOR OR JOINT INVENTOR

Not Applicable

BACKGROUND OF THE INVENTION (1) Field of the Invention (2) Description of Related Art Including Information Disclosed Under 37 CFR 1.97 and 1.98

The disclosure and prior art relates to cooler devices and more particularly pertains to a new cooler device for storing a beverage container that additionally has speakers for playing music while storing a beverage container.

BRIEF SUMMARY OF THE INVENTION

An embodiment of the disclosure meets the needs presented above by generally comprising a cylinder and an insulator that is positioned within the cylinder. The insulator insertably receives a beverage container. Moreover, the insulator is comprised of a thermally insulating material to inhibit thermal communication between the beverage container and ambient air. An audio unit is coupled to the cylinder to emit audible sounds outwardly therefrom. The audio unit is selectively placed in wireless electrical communication with an electronic device thereby facilitating the audio unit to receive and play an audio signal from the electronic device.

There has thus been outlined, rather broadly, the more important features of the disclosure in order that the detailed description thereof that follows may be better understood, and in order that the present contribution to the art may be better appreciated. There are additional features of the disclosure that will be described hereinafter and which will form the subject matter of the claims appended hereto.

The objects of the disclosure, along with the various features of novelty which characterize the disclosure, are pointed out with particularity in the claims annexed to and forming a part of this disclosure.

BRIEF DESCRIPTION OF SEVERAL VIEWS OF THE DRAWING(S)

The disclosure will be better understood and objects other than those set forth above will become apparent when consideration is given to the following detailed description thereof. Such description makes reference to the annexed drawings wherein.

DETAILED DESCRIPTION OF THE INVENTION

Figure 1:
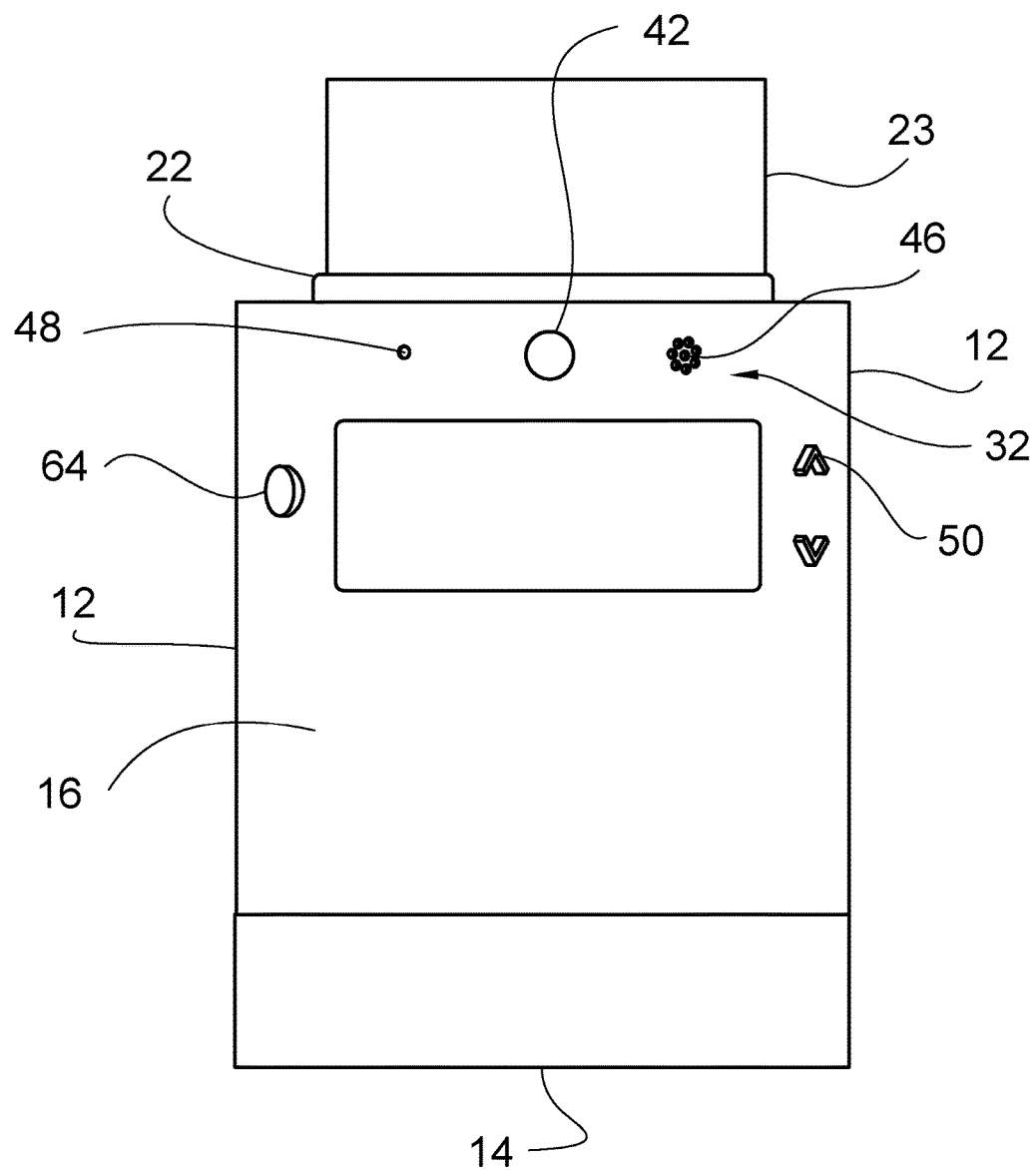
FIG. 1 is a front view of a beverage cooler assembly according to an embodiment of the disclosure.
Figure 2:
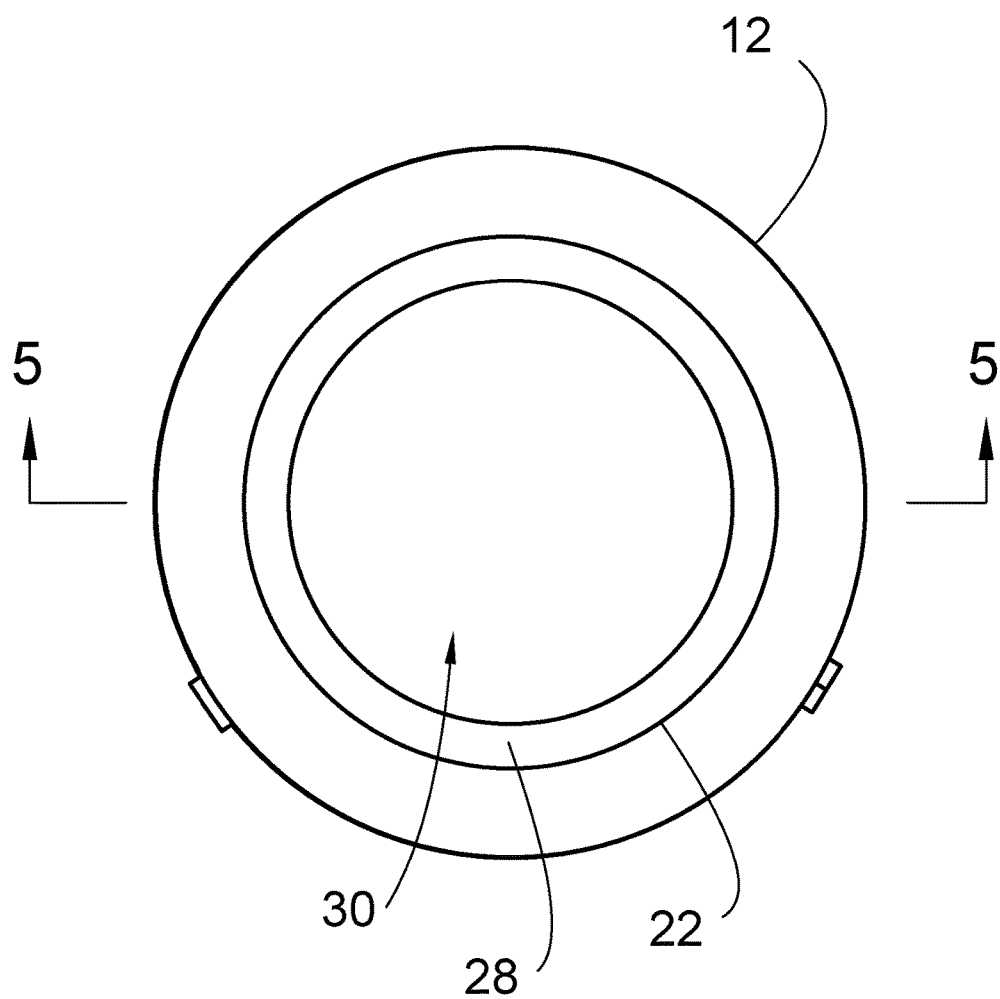
FIG. 2 is a top view of an embodiment of the disclosure.
Figure 3:
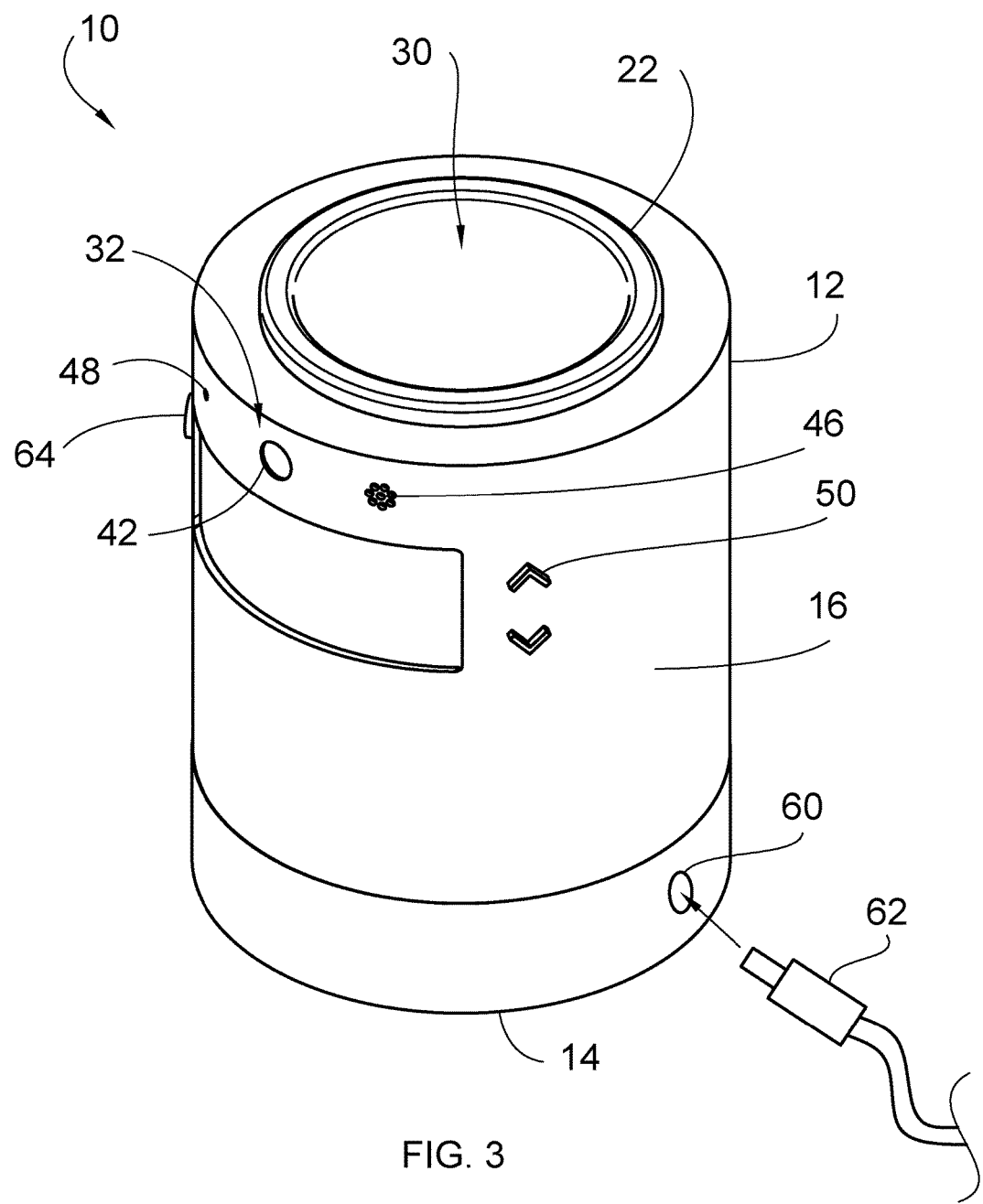
FIG. 3 is a top perspective view of an embodiment of the disclosure.
Figure 4:
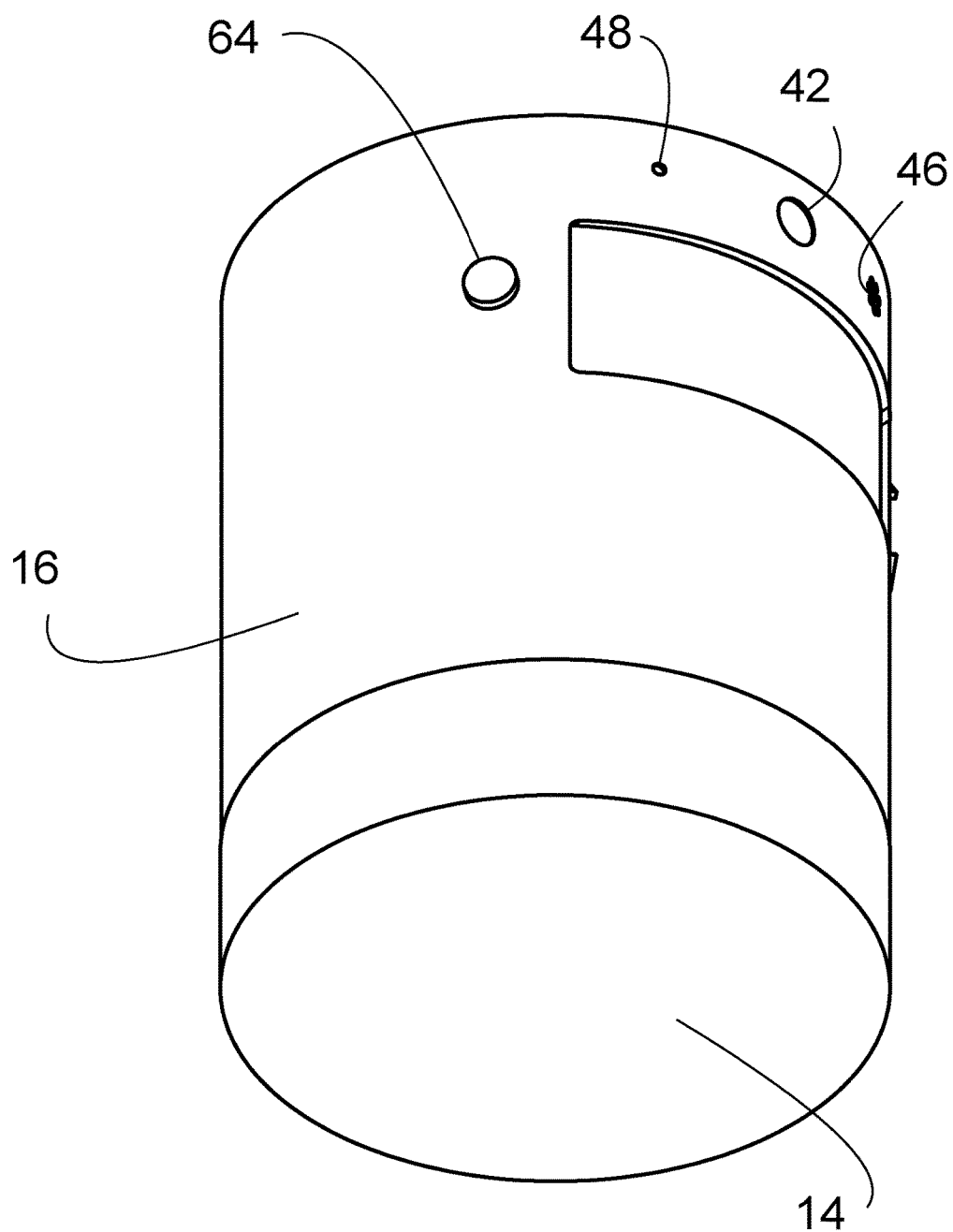
FIG. 4 is a bottom perspective view of an embodiment of the disclosure.
Figure 5:
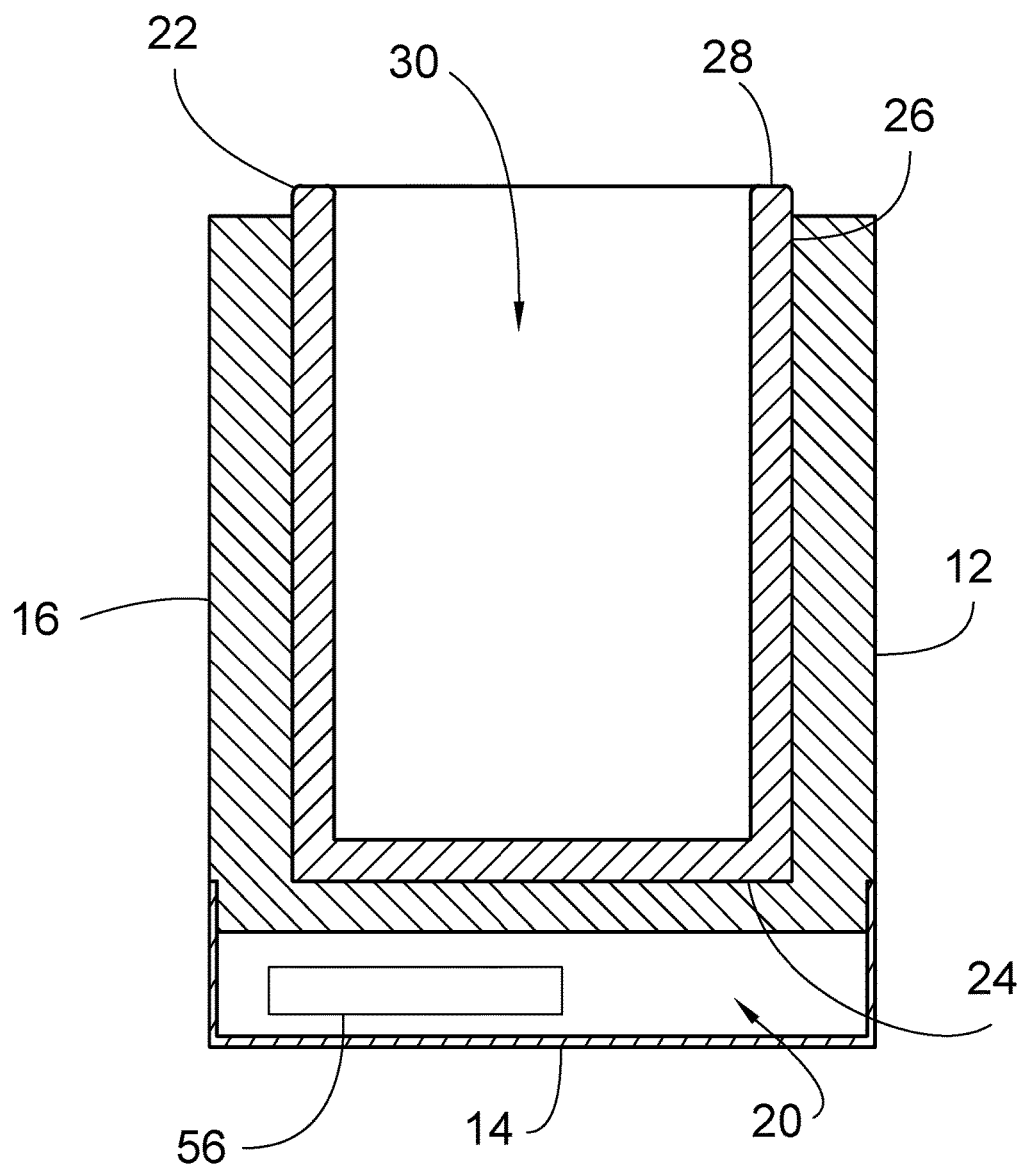
FIG. 5 is a cross sectional view taken along line 5-5 of FIG. 2 of an embodiment of the disclosure.
Figure 6:
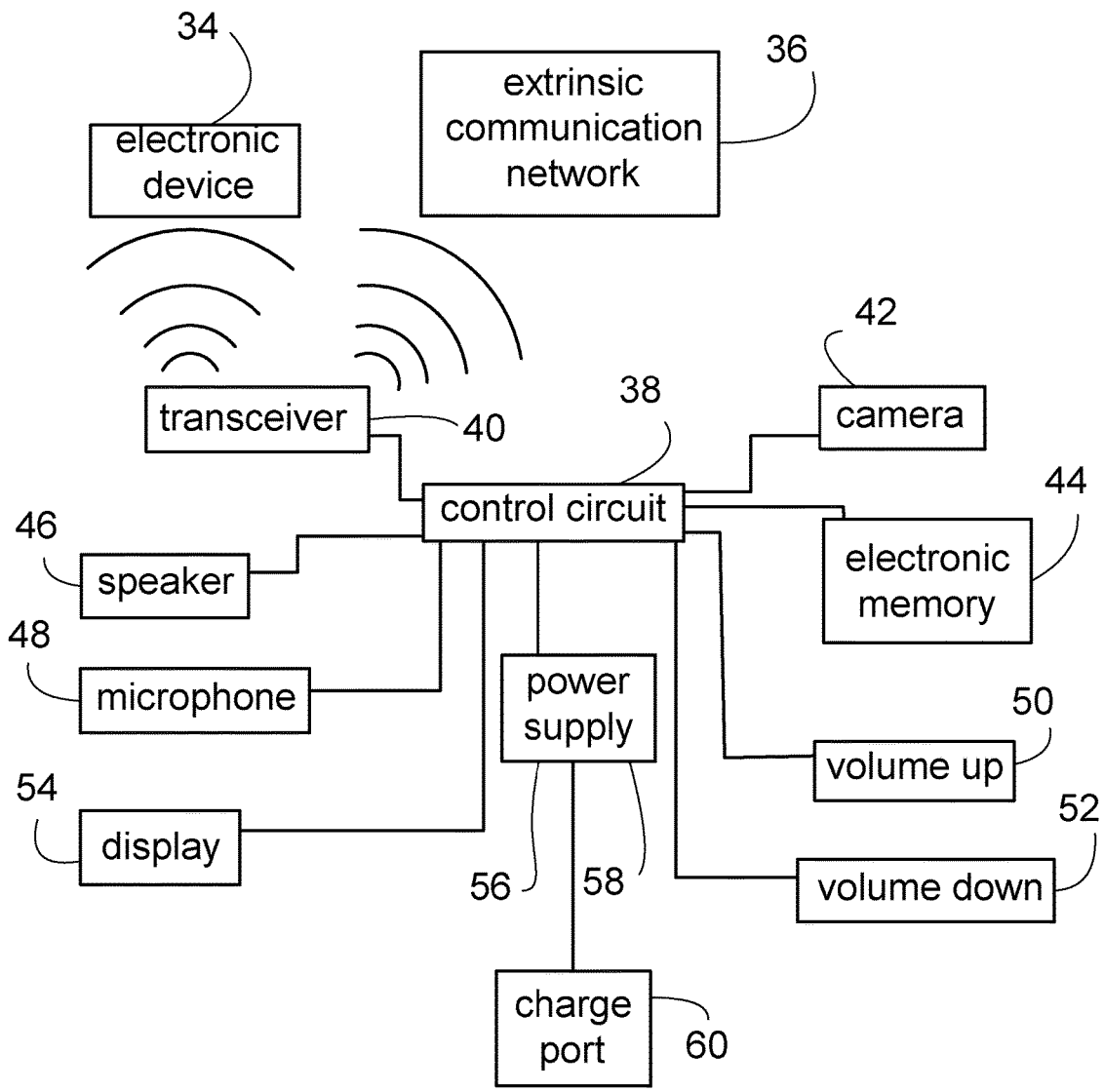
FIG. 6 is a schematic view of an embodiment of the disclosure.

With reference now to the drawings, and in particular to FIGS. 1 through 6 thereof, a new cooler device embodying the principles and concepts of an embodiment of the disclosure and generally designated by the reference numeral 10 will be described.

As best illustrated in FIGS. 1 through 6, the beverage cooler assembly 10 generally comprises a cylinder 12 that has a bottom wall 14 and an outer wall 16 extending upwardly therefrom. The outer wall 16 has an inside surface 18 and the cylinder 12 is comprised of a thermally insulating material. Moreover, the bottom wall 14 has a power supply chamber 20 therein and the bottom wall of the cylinder may be removable from the cylinder to expose the power supply chamber 20. An insulator 22 is positioned within the cylinder 12 to insertably receive a chilled beverage container 23, such as a soda can, a beer bottle and any other beverage container 23. The insulator 22 is comprised of a thermally insulating material to inhibit thermal communication between the beverage container 23 and ambient air.

The insulator 22 has a lower wall 24 and an outside wall 26 extending upwardly therefrom. The outside wall 26 has a distal edge 28 with respect to the lower wall 24 to define an opening 30 into the insulator 22 to receive the beverage container 23. The outside wall 26 is continuous such that the insulator 22 has a cylindrical shape. Moreover, the outside wall 26 engages the inside surface 18 of the outer wall 16 and the lower wall 24 rests on the bottom wall 14 when the insulator 22 is positioned in the cylinder 12.

An audio unit 32 is coupled to the cylinder 12 to emit audible sounds outwardly therefrom. The audio unit 32 is in wireless electrical communication with an electronic device 34 thereby facilitating the audio unit 32 to receive an audio signal from the electronic device 34. The electronic device 34 may be a smart phone, a laptop computer and any other electronic device 34 capable of storing digital audio data. Additionally, the audio unit 32 may be placed in electrical communication with an extrinsic communication network 36, such as the internet or the like, for streaming media. The audio unit 32 is sealed against moisture intrusion through any conventional means of designing and constructing water proof electronics.

The audio unit 32 comprises a control circuit 38 that is positioned within the cylinder 12. A transceiver 40 is positioned within the cylinder 12 and the transceiver 40 is electrically coupled to the control circuit 38. The transceiver 40 is in selective electrical communication with the electronic device 34 for receiving the audio signal. Additionally, the transceiver 40 is in selective electrical communication with the extrinsic communication network 36.

The transceiver 40 may be a radio frequency transceiver 40 or the like and the transceiver 40 may employ a WPAN signal and Bluetooth communication protocols. The transceiver 40 may connect to the extrinsic communication network 36 via a wifi router or the like. Additionally, the transceiver 40 may be synched with the electronic device 34 using Bluetooth and the transceiver 40 is capable of receiving AM and FM radio broadcast signal. A camera 42 is coupled to the outer wall 16 of the cylinder 12 to capture images. The camera 42 is electrically coupled to the control circuit 38 such that images captured by the camera 42 are stored in the electronic memory 44. The camera 42 may be a digital camera 42 of any conventional design.

An electronic memory 44 is positioned within the cylinder 12 and the electronic memory 44 is electrically coupled to the control circuit 38. The electronic memory 44 stores data comprising music or other data. Additionally, the data may be wirelessly transmitted into the electronic memory 44 via the transceiver 40. A speaker 46 is coupled to the outer wall 16 of the cylinder 12 for emitting audible sounds outwardly therefrom. The speaker 46 is electrically coupled to the control circuit 38 such that the speaker 46 receives the audio signal from the transceiver 40 or the data from the electronic memory 44. A microphone 48 is coupled to the outer wall 16 of the cylinder 12 to detect audible sounds. The microphone 48 is electrically coupled to the control circuit 38 and the microphone 48 records audible sounds into the electronic memory 44. Additionally, the electronic memory 44 may store voice commands and the microphone 48 may receive spoken voice commands for controlling operational parameters of the control circuit 38.

A volume up button 50 is coupled to the outer wall 16 of the cylinder 12 and the volume up button 50 is electrically coupled to the control circuit 38. The volume up button 50 increases a volume of the speaker 46. A volume down button 52 is coupled to the outer wall 16 of the cylinder 12 and the volume down button 52 is electrically coupled to the control circuit 38. The volume down button 52 decreases a volume of the speaker 46. A display 54 is coupled to the outer wall 16 of the cylinder 12 and the display 54 is electrically coupled to the control circuit 38. The display 54 displays indicia corresponding to operational parameters of the control circuit 38 and the transceiver 40 and the display 54 may be a touch screen LCD or the like.

A temperature sensor 53 is coupled to the insulator 22 and the temperature sensor 53 is in thermal communication with the beverage container 23 when the beverage container 23 is positioned in the insulator 22. The temperature sensor 53 is electrically coupled to the control circuit 38 and the temperature sensor 53 may comprise an electronic temperature sensor of any conventional design. The display 54 displays numbers corresponding to the temperature of the beverage container.

A power supply 56 is positioned within the power supply chamber 20 and the power supply 56 is electrically coupled to the control circuit 38. The power supply 56 comprises at least one battery 58 that is positioned within the power supply chamber 20. A charge port 60 is coupled to the outer wall 16 of the cylinder 12 and the charge port 60 is selectively and electrically coupled to a power source 62 such as a battery charger or the like. The charge port 60 is electrically coupled to the at least one battery 58 for charging the at least one battery 58. A power button 64 is coupled to the outer wall 16 of the cylinder 12 and the power button 64 is electrically coupled to the at least one battery 58.

In use, the beverage container 23 is positioned in the insulator 22 to keep the beverage container 23 chilled. The transceiver 40 is selectively synched with the electronic device 34 to stream audio through the speaker 46. Additionally, the transceiver 40 can be connected to the internet via wifi to stream from online media providers, such as Pandora, YouTube and other online providers. In this way a user can listen to music or other streamed media whenever the user is carrying the cylinder 12. The water proof qualities of the audio unit 32 facilitate the music or other media to be streamed when the user is in a pool or the like. Thus, the beverage container 23 may be taken nearly anywhere without fear of damaging the audio unit 32.

With respect to the above description then, it is to be realized that the optimum dimensional relationships for the parts of an embodiment enabled by the disclosure, to include variations in size, materials, shape, form, function and manner of operation, assembly and use, are deemed readily apparent and obvious to one skilled in the art, and all equivalent relationships to those illustrated in the drawings and described in the specification are intended to be encompassed by an embodiment of the disclosure.

Therefore, the foregoing is considered as illustrative only of the principles of the disclosure. Further, since numerous modifications and changes will readily occur to those skilled in the art, it is not desired to limit the disclosure to the exact construction and operation shown and described, and accordingly, all suitable modifications and equivalents may be resorted to, falling within the scope of the disclosure. In this patent document, the word "comprising" is used in its non-limiting sense to mean that items following the word are included, but items not specifically mentioned are not excluded. A reference to an element by the indefinite article "a" does not exclude the possibility that more than one of the element is present, unless the context clearly requires that there be only one of the elements.

I claim:

1. A beverage cooler assembly being configured to be in electrical communication with an electronic device for streaming media, said assembly comprising:

a cylinder being configured to be gripped, said cylinder having a bottom wall and an outer wall extending upwardly therefrom, said outer wall having an inside surface, said cylinder being comprised of a thermally insulating material said bottom wall having a power supply chamber therein;

an insulator being coupled within said cylinder wherein said insulator is configured to insertably receive a beverage container, said insulator being comprised of a thermally insulating material wherein said insulator and said cylinder are configured to inhibit thermal conduction between the beverage container and ambient air, said insulator having a lower wall and an outside wall extending upwardly therefrom, said outside wall having a distal edge with respect to said lower wall to define an opening into said insulator wherein said opening is configured to receive the beverage container, said outside wall being continuous such that said insulator has a cylindrical shape, said outside wall engaging said inside surface of said outer wall and said lower wall resting on said bottom wall;

an audio unit being coupled to said cylinder wherein said audio unit is configured to emit audible sounds outwardly therefrom, said audio unit being configured to be in wireless electrical communication with an electronic device thereby facilitating said audio unit to receive and play an audio signal from the electronic device, said audio unit comprising:

a control circuit being positioned within said cylinder;

a transceiver being positioned within said cylinder, said transceiver being electrically coupled to said control circuit, said transceiver being configured to be in selective electrical communication with the electronic device for receiving the audio signal, said transceiver being configured to be in selective electrical communication with an extrinsic communication network;

an electronic memory being positioned within said cylinder, said electronic memory being electrically coupled to said control circuit, said electronic memory storing data comprising music;

a speaker being coupled to said outer wall of said cylinder wherein said speaker is configured to emit audible sounds outwardly therefrom, said speaker being electrically coupled to said control circuit such that said speaker receives the audio signal from said transceiver or the data from said electronic memory;

a microphone being coupled to said outer wall of said cylinder wherein said microphone is configured to detect audible sounds, said microphone being electrically coupled to said control circuit wherein said microphone is configured to record audible sounds into said electronic memory;

a volume up button being coupled to said outer wall of said cylinder, said volume up button being electrically coupled to said control circuit, said volume up button increasing a volume of said speaker;

a volume down button being coupled to said outer wall of said cylinder, said volume down button being electrically coupled to said control circuit, said volume down button decreasing a volume of said speaker; and a power supply being positioned within said power supply chamber, said power supply being electrically coupled to said control circuit, said power supply comprising:
  at least one battery being positioned within said power supply chamber, said at least one battery being electrically coupled to said control circuit;
  a charge port being coupled to said outer wall of said cylinder wherein said charge port is configured to be electrically coupled to a power source, said charge port being electrically coupled to said at least one battery for charging said at least one battery; and
  a power button being coupled to said outer wall of said cylinder, said power button being electrically coupled to said at least one battery;

a temperature sensor being coupled to said insulator wherein said temperature sensor is configured to be in thermal communication with the beverage container when the beverage container is positioned in said insulator, said temperature sensor being electrically coupled to said control circuit; and a camera being coupled to said outer wall of said cylinder wherein said camera is configured to capture images, said camera being electrically coupled to said control circuit such that images captured by said camera are stored in said electronic memory.

* * * * *